May 14, 1968          C. E. TRIPP          3,383,587
DWELL-TACHOMETER INSTALLATION
Filed Oct. 21, 1965
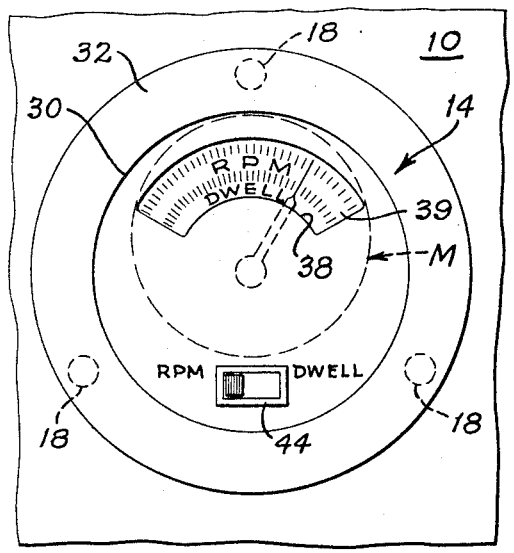
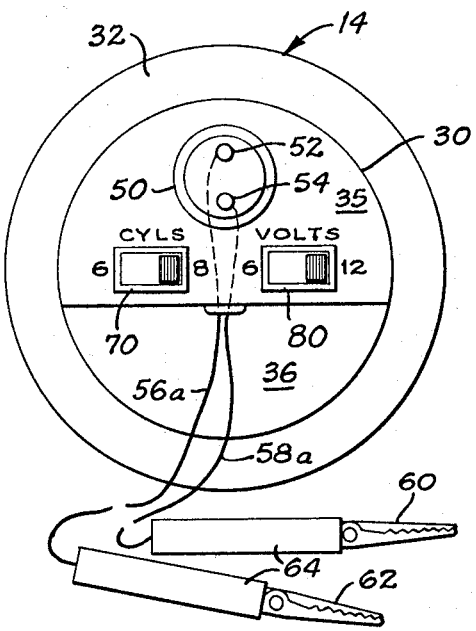
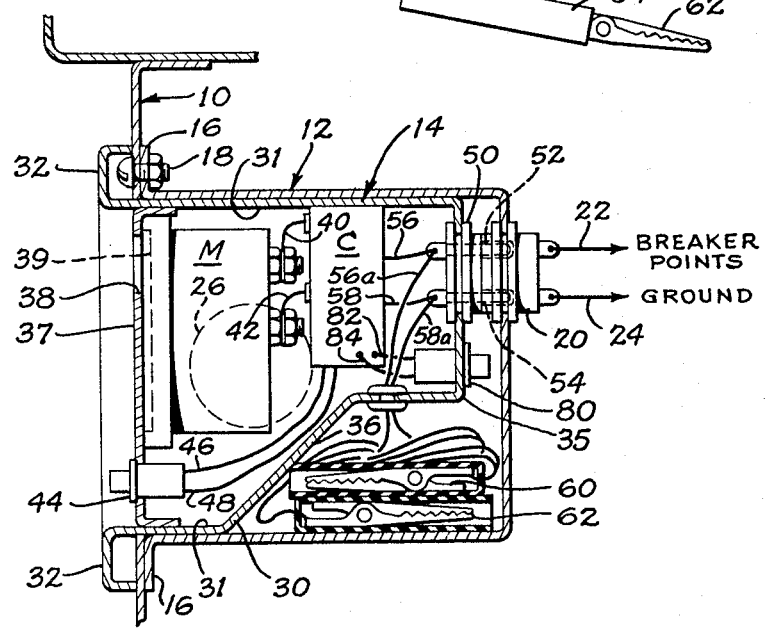
INVENTOR
C. E. Tripp

| United States Patent Office | 3,383,587
| --- | --- |
| | Patented May 14, 1968 |

3,383,587
DWELL-TACHOMETER INSTALLATION
Charles E. Tripp, 15241 Oak Ridge Way,
Los Gatos, Calif. 95030
Filed Oct. 21, 1965, Ser. No. 499,162
10 Claims. (Cl. 324—16)

ABSTRACT OF THE DISCLOSURE

A combined dwell angle-tachometer instrument is plug-mounted in the vehicle dashboard and a switch providing for giving readings of either function during driving. Auxiliary test leads are stored in the dash receptacle for tune up use.

---

This invention relates to a dwell angle-tachometer installation wherein the functioning instrument is removably mounted in the instrument panel of a parent vehicle during driving, and can be unplugged and used with its own auxiliary test leads for checking the motor on the parent or on another vehicle. Features of the invention are:

(1) The instrument selectively provides r.p.m. and dwell angle indications while driving (normal use).

(2) The instrument plugs into permanent signal and ground connections for normal use.

(3) When used inside in the parent vehicle (normal use), the only selector switch visible is the r.p.m.-dwell switch (preferred embodiment).

(4) The instrument is quick-detachable for external use on the parent car or on another car, and carries its own auxiliary test leads.

(5) Other function switches, such as cylinder number and battery voltage selector switches are accessible when the instrument is detached.

(6) The instrument does not give the appearance of a test unit in normal use.

A detailed description of a preferred embodiment of the invention follows.

In the drawings:

FIGURE 1 is a front elevation of the installation unit in normal use.

FIGURE 2 is a vertical section of the installation with internal parts left unsectioned.

FIGURE 3 is a rear view of the instrument as removed for test use.

Referring to the drawings, an instrument panel 10 is shown. This may be the vehicle dash panel or a separate plate attachment. The panel 10 is apertured to receive a receptacle cup 12, in which a functioning instrument assembly 14 is nested. The receptacle 12 is flanged at 16 for mounting on the panel by screws 18. A socket 20 is mounted on the rear (bottom) wall of the receptacle and connects to a car breaker point (signal) lead 22 and a ground lead 24. These leads provide the signal and power to the pin sockets in the socket 20 for normal use, and correspond electrically to the test leads of a conventional test instrument of this type. The case 30 has finger access ports 26 in each side for grasping the instrument 14 during removal.

The instrument 14 is the actual r.p.m.-dwell angle meter assembly. It has a case 30 in the form of a specially shaped cup having a cylindrical wall 31 and an ornamental flange 32. The instrument case 30 has a rear wall 35 that faces the rear wall of the receptacle, and a sloping wall 36 that also faces to the rear and down. A conventional ammeter M is secured to a front cover plate 37 riveted to the case 30 (FIG. 2). The cover plate 37 is apertured at 39 to reveal the calibrated r.p.m.-dwell dial 39 of the meter, which dial is behind glass in the usual manner.

The meter terminals have leads 40, 42 connecting to the circuitry, the latter being indicated by a box C. The circuit C is of conventional design, using car battery power and the usual diodes, resistors, integrating condensers, and preferably transistors and even Zener diodes for voltage regulation.

An r.p.m.-dwell switch 44 is mounted in the front cover plate 37, and its leads 46, 48 connect to the circuit C.

A connector including a plug 50 is mounted in the rear wall 35 of the instrument case 30 and has connector pins 52, 54 for the pin socket of the socket 20. Leads 56, 58 connect the plug pins 52, 54 (and hence the external leads 22, 24) to the circuit C during normal use. The plug and socket connector 50, 20 holds the instrument 14 in place during normal use. The plug can also be mounted on the receptacle 12 and the socket on the case 14 with equal convenience.

Auxiliary or test leads 56a, 58a connect to the pins 52, 54 of the socket 50 and run through a grommet in the case wall 36, terminating in alligator clips 60, 64. These test leads nest in a storage space between the instrument case wall 36 and the receptacle cup 12 for storage during normal use. A pull-back rubber cover 64 surrounds each clip during storage.

Mounted in the rear wall 35 of the instrument case 30 are two function switches. One of these is an engine cylinder number selector in the form of a 6-cyl.-8 slide switch 70. This switch has leads (not shown) running to the circuit C. The other function switch is a slide switch 80, which is a 6-volt-12 battery voltage selector having leads 82, 84 (FIG. 2) running to the circuit C.

The electrical details of the circuit C, and its electrical connection to the meter M, the test leads, and the switches 44, 70 and 80 are not critical to the invention. These electrical connections are conventional, and can be of the type employed in the Dwell-Tachometer Model 45, manufactured by the Harvey E. Hanson Co. of Paw Paw, Mich. This is merely an example. The invention is neither dependent upon nor limited to the use of a particular circuit, any of the conventional, universal type combination r.p.m.-dwell circuits and their selector switch connections can be employed.

In normal use, the instrument assembly 14 is plugged into the socket 20 with the test lead clips covered and stored, as seen in FIG. 2. Function switches 70, 80 are set for the parent car. Switch 44 is set to display either r.p.m. or dwell angle to the driver, on receiving signals from the permanent socket leads 22, 24, through the plug and socket (connector) assembly.

In testing another car (or in adjusting the parent car), the instrument 14 is unplugged, using finger ports or cut-outs 26 (FIG. 2) in opposite sides of the cylindrical wall of the receptacle 12, for gripping access to the instrument case 30. One of such finger ports 82 appears in FIG. 2. The test leads 56a, 58a are unscrambled, the rubber insulating covers 64 are slid or peeled back from the clips 60, 62, and the instrument can be carried to any site for local use.

As seen in FIG. 1, during driving of the parent car, there is no indication that the installation is other than one designed for the parent car.

In another embodiment, the test leads 56a, 58a are electrically connected to a socket (not shown), so that the leads can be connected to the instrument plug 50 when the instrument 14 is removed for external testing. In this form, the socket for the test leads also fits in the storage space.

In the claims, it is understood that the term "vehicle" refers to any vehicle having an engine with an instrument panel and breaker point or transistor ignition. This includes vessels.

Having completed a detailed description of the inven-

I claim:

1. A dwell angle-tachometer installation unit for a vehicle comprising receptacle means for mounting on an instrument panel, instrument case means slidable into said receptacle means, electrical plug and socket means connected to said receptacle and case means, respectively, an r.p.m.-dwell angle meter assembly in said case means, said case means including a front cover plate for the meter assembly, an r.p.m.-dwell selector switch on said cover plate, a cylinder number selector switch on said instrument case means and inside of said receptacle means, and auxiliary test leads for connection to said plug and socket means.

2. The unit of claim 1, wherein said plug and socket means are mounted directly on opposing rear walls of said receptacle and case means, respectively, for holding said receptacle and case means together.

3. The unit of claim 2, wherein said test leads are connected to the meter assembly inside said case means, and wherein said receptacle and case means are formed to provide storage room for said auxiliary test leads.

4. The unit of claim 1, wherein said receptacle and case means are formed to provide storage room for said auxiliary test leads.

5. The unit of claim 4, wherein said case means is flanged to overlie the instrument panel.

6. A dwell angle-tachometer installation unit for a vehicle comprising receptacle means for mounting on an instrument panel, instrument case means slidable into said receptacle means, said receptacle and case means having facing rear walls, an electrical connector mounted on facing rear walls for holding said receptacle and case means together, an r.p.m.-dwell angle meter assembly in said case means, an r.p.m.-dwell selector switch on said case means and accessible when said receptacle and case means are assembled, said latter means being formed to provide a storage pocket when assembled, and auxiliary test leads in said pocket.

7. The unit of claim 6, wherein a cylinder number selector switch is mounted on said case means and inside of said receptacle means when the latter two means are assembled.

8. The unit of claim 6, wherein said test leads are connected to the electrical connector half on said case means.

9. The unit of claim 8, wherein said test leads terminate in clips, and removable insulating means on said clips.

10. The unit of claim 6, wherein a cylinder number selector switch and a battery voltage selector switch are mounted on said case means and inside of said receptacle means when the latter two means are assembled.

References Cited

UNITED STATES PATENTS

| | | | |
|---|---|---|---|
| 2,643,362 | 6/1953 | Johansson | 324—149 |
| 2,983,868 | 5/1961 | Silberbach | 324—70 |
| 3,064,188 | 11/1962 | Dreiske | 324—70 |
| 3,202,910 | 8/1963 | Fathauer. | |
| 3,219,926 | 11/1965 | Dion. | |
| 3,275,932 | 9/1966 | Parmater | 324—70 |

RUDOLPH V. ROLINEC, *Primary Examiner.*

M. J. LYNCH, *Assistant Examiner.*